July 29, 1958 — W. L. MORSE — 2,844,977

MAGNETIC ALIGNMENT TOOLS

Filed Jan. 24, 1957

INVENTOR.
WILLIAM L. MORSE

BY Reynolds, Beach & Christensen

ATTORNEYS

United States Patent Office 2,844,977
Patented July 29, 1958

2,844,977
MAGNETIC ALIGNMENT TOOLS

William L. Morse, Seattle, Wash., assignor to Boeing Airplane Company, Seattle, Wash., a corporation of Delaware Application January 24, 1957, Serial No. 636,141

7 Claims. (Cl. 77—62)

In certain manufacturing operations as, for instance, in the manufacture of aircraft, where a sloppy fit of a rivet or bolt within its hole is not permissible, difficulty is encountered occasionally where a hole must be drilled blind in a work piece, to register precisely with a hole previously drilled or punched in a support hidden behind the work piece. Generally the difficulty can be resolved by marking or drilling through from the back side, using the hole previously drilled in the support as a locator for marking or as a bushing for the drill, as it drills through the work piece from the under side, but there are locations where this is impossible, either because of the shape of the support, or the inaccessibility thereof. In such instances the accurate drilling of the hole becomes a major problem.

The present invention concerns a method and a tool for use in such situations, whereby a blind hole can be drilled in a work piece in precise axial alignment with a hole in the underlying support, without the necessity for marking of any sort. This it can do, regardless of the orientation of the work, whether horizontally or otherwise. The tool to accomplish this, built according to the present invention, is of comparatively simple construction and relatively inexpensive, and is of an accuracy that permits its regular use in production of the exacting nature described. It depends in minimum degree on visual orientation, and not at all upon any marking upon the work, but will insure precise location and guidance of a drill following location of the axis of the hole to be drilled.

In the accompanying drawings the invention is shown embodied in a tool of the character described, and in a form such as is presently preferred by me.

Figure 1:
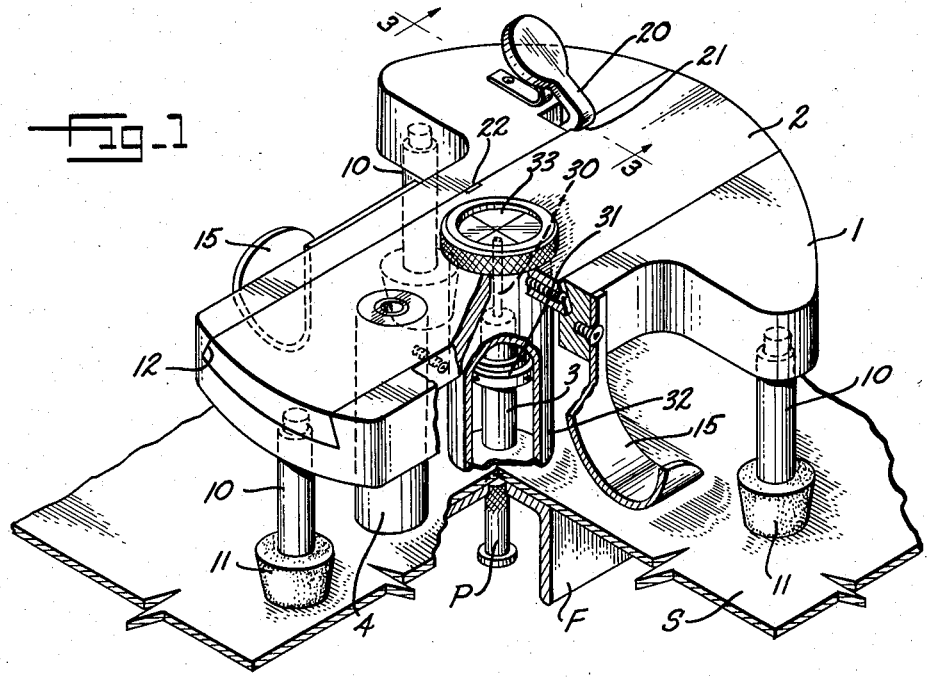
Figure 1 is an isometric view, partly broken away, showing the tool in operation and in a first position of adjustment, and showing portions of the work piece also broken away, to illustrate the principle of operation of the tool.
Figure 3:
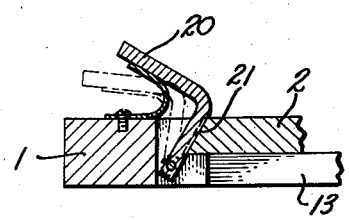
Figure 3 is a detail sectional view at the line 3—3 of Figure 1.

Reference has been made above, and will be made hereinafter (including the claims), to the horizontal orientation of the work piece, to the corresponding horizontal disposition of the table, to the vertical disposition of the tool's magnet and associated pointer, to the lower end of that magnet and the upper end of the pointer, and so on. It is desired to make clear at the outset that such terms of orientation and disposition are used for convenience of reference to the drawings, and are not required by any inherent limitations in the tool nor in its usefulness. Instead, the tool can be used in any orientation of the work, and in other orientations the correspondingly changed terms are to be implied. Also, the magnet and pointer of the tool are so balanced that they are not dependent on the force of gravity for their operation, but solely upon magnetic forces, and the use of the terms that might otherwise imply a dependence on gravity is to be taken in the sense used, as a convenience, for reference to the orientation shown in the drawings.

The tool comprises a frame which engages and is thus oriented in a particular manner relative to a piece of work. It may include a table which is provided with supporting means such as depending feet, by which it may be supported horizontally upon a horizontal piece of work, but in a plane somewhat above the work piece. Supported from the table is a generally elongated magnet and an aligned pointer, the magnet and pointer being supported for universal, though limited, swinging by means of a gimbal mount. While it will be assumed that the magnet is lowermost and the pointer uppermost, as shown in the drawings, this will be understood as a convenience in describing the tool, as has already been made clear. Actually, the magnet and pointer are so balanced that gravity has no effect in positioning the same. Associated with the pointer is a target, such as a reticle or window bearing cross hairs, so that whenever the pointer registers with the two cross hairs where they intersect, it will be known that the magnet and pointer are perpendicular (again, assuming the work to be horizontally disposed), with the magnet in its position of greatest proximity to an underlying attractive element, and axially aligned therewith.

A filler pin or pilot magnet P, the upper end of which is of magnetic polarity opposite to the lower pole of the gimbal-mounted magnet, temporarily inserted in the hole previously drilled in the support, preferably constitutes the magnetically attractive element. Having thus axially aligned the magnet and pointer with the filler pin, means might be provided to mark or to center punch the work piece in precise alignment with the axis of the hole, without shifting the magnet and pointer, but this introduces the possibility of visual error, and preferably the magnet and pointer are mounted for translational movement, rectilinear, rotational, or otherwise, in the plane of the table, to shift a drill bushing into precise alignment with the hole wherewith must register the hole to be drilled. The magnet 3 and drill bushing 4 may be supported upon a slide which is guided in the table for rectilinear movement between this aligned position, described above, and a second position distant from the first or aligned position by a precise distance. The drill bushing, center punch guide, or similar device, also carried upon the slide at this precise distance from the pointer and magnet, is positioned in parallelism therewith when the magnet is in its aligned position, whereby if the table, once accurately located, is held stationary and the slide is moved from the first to the second position, the bushing will constitute a drill guide which is necessarily in precise axial alignment with the blind hole in the support, just as the pointer and magnet were previously in alignment therewith, and so (first removing the filler pin), a hole can be drilled in the work piece with the assurance that it is in alignment with the hole in the support.

Obviously, since operation of the tool depends on magnetism, the tool and the work should be of nonmagnetic material, with the exceptions indicated. A magnetically attractive element might be substituted for the magnet 3, or for the pin P, provided the opposite element in each such case is a magnet, in accordance with known principles, but the arrangement described above is preferred.

Figure 2:
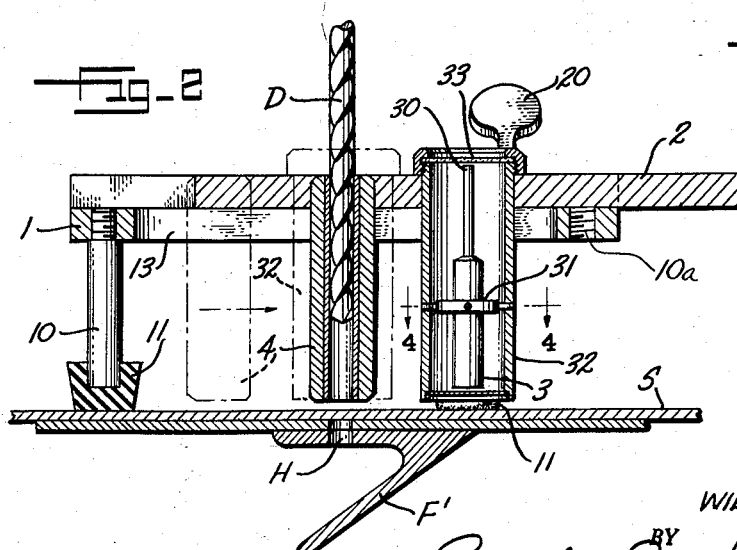
Figure 2 is a vertical sectional view through the tool and work piece taken along a plane which joins the two axes of the locating means and of the drill bushing which preferably constitute a part of the tool, and illustrates by comparison between the dot-dash line position and the full line position the shift between the first position and a second position.
Figure 4:
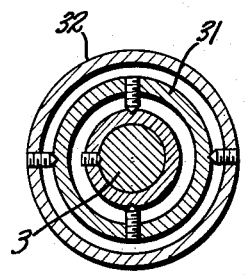
Figure 4 is a transverse sectional view at the line 4—4 of Figure 2.

A typical situation is illustrated in Figure 1, and a slightly different situation in Figure 2. S represents a skin or sheet of metal, as aluminum alloy, which is to be drilled, and F or F' represents an angled frame member which has a hole H previously drilled in it, and through which a rivet must pass, and through the hole to be drilled in the sheet S, to secure the two together.

The filler pin P, which is magnetically attractive, being preferably a fixed pilot magnet, is first received in the hole H. Care is taken to have uppermost its pole which is of opposite polarity to the lower pole of the tool's magnet. It should be readily removable, but should be such as will maintain itself in place in proper axial alignment with the hole H. Now the tool of this invention is brought into operation. It comprises a table 1 having depending legs 10, preferably three in number and equal in length, which rest upon the surface of the sheet S and support the table elevated above but in a plane parallel to the sheet S. Preferably, the legs are provided with feet 11 of material such as a rubber composition, which can be moved over but which when once located will not slip readily with respect to the surface of the sheet S. The shape of the table is not material, but it may be of generally T shape, with the legs located at the extremities of the cross arms of the T and at the lower end of the stem thereof, or, for drilling close to an edge, one leg may be located in the socket 10a at the upper end of the stem rather than at the end of the cross arm.

The table is provided with guide means as indicated by the slot 12, preferably extending lengthwise of the stem, for the reception of the slide 2, and the central portion of the stem of the table beneath the slide 2 is recessed as seen at 13 in Figure 2. Depending from this slide through the recess 13 is a support for a generally elongated permanent magnet 3 and aligned pointer 30. These are supported for free but limited universal movement, from a gimbal mount generally indicated by the numeral 31, and the support for the gimbal mount may well be a cylinder 32. By balancing the combined magnet 3 and pointer 30 about their center of support in the gimbal mount, they are freed from the influence of gravity, and respond solely to magnetic forces. Adjacent the upper end of the pointer is a window or reticle 33 carrying cross hairs which cooperate with the pointer as a target to indicate when the magnet 3 is in axial alignment with the strongly attractive magnetic filler pin P. The attraction between the adjacent opposite poles of magnets P and 3 is sufficiently strong that nearby steel rivets will not deflect the magnet 3.

As has been indicated above, a device of the nature described, with nothing more, and indeed, without the slide, would serve to locate the axis of the hole H, for as the tool is moved bodily over the surface of the sheet S, its magnet 2 will incline this way or that way, as permitted by the gimbal mount 31, until the tool is located with the magnet 2 in precise axial alignment with the filler pin P. When this occurs, the pointer 30 will register with the intersection of the cross hairs.

Without more, however, the tool would be awkward to use, hence, the slide is provided further with a depending bushing 4, the axis whereof is located a given distance from the axis which is determined by the magnet and pointer when the pointer is in register with the cross hairs, and the two, the axis of the bushing 4 and of the pointer and magnet, are in this first position in parallelism, and the shortest possible line joining their axes is parallel to the guide for the slide. The slide is permitted translational movement from this first position to a distant or second position, the movement being by precisely the distance between the two axes mentioned above, so that when the slide is moved, the table being held stationary relative to the work piece, the axis of the bushing 4 will come into precise alignment with the axis of the hole H. In order to insure that the slide will move only this distance, stop means are provided, such as a spring latch 20 mounted upon the table, engageable within the notches 21 or 22 of the slide, these notches being spaced apart by the precise distance through which the slide is to be permitted to move. The bushing 4, as has been indicated, may constitute a guide for a center punch or for a drill bit D, shown in Figure 2.

For convenience, hold-down means 15 may be affixed to the table at opposite sides of the stem of the T to facilitate moving the table, and subsequently holding the same fixedly in its adjusted position while the slide is being moved from the first to the second position.

It is desired to point out again that the tool will operate in the manner described even though the work be not horizontally disposed, nor the magnet 3, in use, be perpendicular. The magnet 3 and pointer 30 being balanced about their center of support, will tend to remain in any given position despite the attraction of gravity, and the attraction of the pilot magnet, or pin P, will effect alignment therewith of the magnet 3, even though the work be upright, or if it be overhead, or indeed, in any orientation. The use of the terms "horizontal," "perpendicular," "uppermost," and the like, in the specification and claims, has been for convenience of description, and with reference to the showing in the drawings, and is not to be taken as limiting the invention nor its use.

Further it should be understood that the use of a window bearing cross hairs is but one of a number of possible target or aligning means which may be utilized in association with the pointer.

I claim as my invention:

1. A tool for drilling a hole through a work piece in axial alignment with a hole in a second piece when the latter hole is obscured by the work piece, in which hidden hole a magnetically attractive pilot pin is centered, said tool comprising a table and means to support the same generally parallel to the work piece, a slide guided by said table for movement in the plane of the table through a given distance between a first and a second position, a drill guide supported upon said slide and oriented perpendicularly to the plane of the table, a magnet support also supported upon said slide, a magnet supported from said magnet support for independent movement into alignment with the pilot pin when the magnet, through bodily movement of the table, and with the slide in a first position, comes into such alignment, means to indicate such alignment of the magnet, the magnet support and the drill guide being spaced apart by a distance, in the direction of movement of the slide relative to the table, equal to such given distance, to bring the drill guide into axial alignment with the aligned position of the magnet, by shifting of the slide through such distance to its second position.

2. A tool for locating the axis of a blind hole in a work piece which is disposed in a given orientation, e. g., horizontally, and which hole is adapted to receive a removable pilot magnet, said tool comprising a generally elongated magnet and an aligned pointer, a gimbal mount supporting the pointer and magnet for universal movement, balanced about its center of support, in upright disposition, with the pointer uppermost, and the magnet with its lower pole of opposite polarity to the adjacent upper pole of the pilot magnet, a slide whereon said gimbal mount is fixed, a window bearing cross hairs, and fixed upon said slide adjacent the pointer, to indicate when the gimbal-mounted magnet is axially aligned with the pilot magnet, a table having means to support itself from the work piece fixedly in an adjusted position relative to the work piece, said table having guide means interengageable with the slide for translational movement of the slide between two positions, in a first of which the gimbal-mounted magnet is axially aligned with the pilot magnet and the pointer registers with the cross hairs, and the other of which is located a given distance from such first position, and a bushing fixed upon said slide, in parallelism to the pointer and magnet when the latter are in the first position, and having its axis located at a spacing from the magnet and pointer equal to the distance between the slide's two positions.

3. A tool as in claim 2, including releasable positioning means interengageable between the table and the slide, to fix the slide in each of its two positions.

4. A tool as in claim 2, including legs depending from the table to retain the same, and the slide, elevated above but in a plane parallel to the surface of the work piece, the bushing depending below the slide to the vicinity of the work piece, a tube housing and supporting the gimbal-mounted magnet, pointer, and gimbal mount, and the window, and itself depending below the slide to the vicinity of the work piece.

5. A tool as in claim 2, wherein the table is generally of T-shape, and the slide's guide extends lengthwise of the stem thereof, and wherein the table-supporting means comprises three legs depending from the table to constitute a tripod support, and hold-down means at the two opposite sides of the stem, whereby to press the legs against the work piece after having located the magnet and pointer in axial alignment with the pilot magnet, while the slide is shifted to align the bushing with such pilot magnet.

6. A method of drilling blind holes in a workpiece that overlies and obscures a hole in an underlying element, with which hole the blind hole must register, which method comprises locating a magnetically attractive filler pin in the existing hole, locating a magnet by its attraction to said filler pin in axial alignment therewith, thereby to locate a drill guide which is then axially parallel to the magnet at a given distance along a given line from the existing hole's axis, translating the magnet and drill guide by such distance and along such line, to align the drill guide with the hole's axis, and drilling the workpiece through the so-located drill guide.

7. A tool for locating the axis of a blind hole in a work piece which is disposed in a given orientation, e. g., horizontally, and in which hole is centered a magnetically attractive filler pin, said tool comprising a table; means to support the table above and in a given relationship, such as in a parallel plane, to the work piece; a generally elongated magnet and a pointer fixed to the magnet; a gimbal mount and a gimbal-supporting means supporting the magnet and pointer for universal movement, and for shifting relative to the table; a target fixed relative to said gimbal-supporting means, and cooperating with the pointer to indicate when the magnet, in a first position, is in upright disposition, aligned with the filler pin; an elongated element offset by a given distance from the magnet and supported in fixed relation to the gimbal-supporting means, for shifting with the latter to a second position, and disposed in parallelism with the magnet when the pointer, in the first position, registers with the target; and means limiting shifting of the gimbal-supporting means to a distance equal to the offset of the elongated element from the magnet, so that the elongated element in the second position is axially aligned with the blind hole.

References Cited in the file of this patent

UNITED STATES PATENTS

| | | |
|---|---|---|
| 2,346,773 | McBride et al. | Apr. 18, 1944 |
| 2,600,857 | De La Mater | June 17, 1952 |
| 2,807,780 | Ludwig et al. | Sept. 24, 1957 |